Patented May 27, 1941

2,243,295

UNITED STATES PATENT OFFICE 2,243,295

PROCESS FOR THE PRODUCTION OF N-SUBSTITUTED (ARYLALKYL) AMINES

Alfred G. Susie, Boston, Mass., and Henry B. Hass, West Lafayette, Ind., assignors to Purdue Research Foundation, La Fayette, Ind., a corporation of Indiana No Drawing. Application November 15, 1939, Serial No. 304,551

9 Claims. (Cl. 260—577)

Our invention relates to a process for the production of secondary amines, and more specifically to the production of alkyl(arylalkyl) amines, (arylalkyl) amines, and di(arylalkyl) amines from (arylhydroxyalkyl) amines.

The (arylhydroxyalkyl) amines may be prepared, for example, by condensing nitroparaffins with aromatic aldehydes (Nagai, U. S. P. 1,973,-647), and subjecting the resulting condensation product to reduction by means of iron in an acid solution (Nagai, supra), or by catalytic hydrogenation (Johnson, U. S. P. 2,157,386).

We have now found that (arylhydroxyalkyl)-amines may be transformed into alkyl(arylalkyl)-amines by condensing the former compounds with aldehydes, and subjecting the resulting condensation product to liquid phase catalytic hydrogenation.

The first step of our process constitutes the condensation of an aldehyde and an (arylhydroxyalkyl)amine. Any of the (arylhydroxyalkyl)amines are suitable for this reaction, but we prefer to employ those of the type

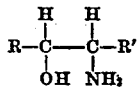

especially those in which R represents phenyl or substituted phenyl, and in which R' represents hydrogen or a lower alkyl group. Any aldehyde may be employed for the condensation as for example, aliphatic aldehydes such as formaldehyde, acetaldehyde, or crotonaldehyde, aromatic aldehydes such as benzaldehyde, or other cyclic aldehydes such as furfural. We prefer to employ the lower saturated aliphatic aldehydes, and especially formaldehyde.

The initial condensation reaction will take place at room temperature, and requires no special conditions. In order to secure a satisfactory mixture of the reactants, it is desirable to employ a common solvent, such as aqueous or anhydrous ethanol, and for this purpose it is convenient to utilize a solvent which may be employed in the subsequent hydrogenation reaction. Formaldehyde may be added in the form of the gas, formalin solution, or as paraformaldehyde. Acetaldehyde may likewise be added in the form of the pure liquid, in the form of a solution, or as paraaldehyde, and the higher molecular weight aldehydes are conveniently employed in the liquid form. The amount of aldehyde employed should be at least equal to the number of moles of the (arylhydroxyalkyl) amine. A slight excess is usually desirable, but a large excess is usually to be avoided, since any excess aldehyde will be hydrogenated in the succeeding stage of the process. The condensation reaction is exothermic in nature, and in large scale operations it may be desirable to cool the mixture during the reaction.

The condensation reaction is believed to comprise a simple addition reaction, followed by the splitting out of water. In the case of (arylhydroxyalkyl) amines in which the hydroxy and amino groups are separated by at least two carbon atoms, the resulting product is probably an N-alkylidene(arylhydroxyalkyl) amine, as, for example, N-methylene(4-phenyl-4-hydroxybutyl)-amine:

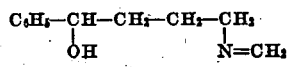

which may be obtained by the condensation of formaldehyde with 4-phenyl-4-hydroxybutylamine.

If the hydroxy and amino groups in the (arylhydroxyalkyl) amine are not separated by at least two carbon atoms, the aldehyde condensation product probably has an oxazine or an oxazole ring structure, as, for example, 2,5-dihydro-4-methyl-6-phenyl-1,3-oxazine:

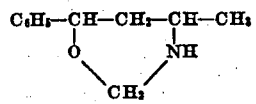

which may be obtained by the condensation of formaldehyde and 4-phenyl-4-hydroxy-2-butylamine. If the preferred type of (arylhydroxyalkyl) amine, having the hydroxy and amino groups on adjacent carbon atoms, is employed in the condensation, the resulting product is probably an aryl-oxazolidine, as, for example, 4-methyl-5-phenyl-oxazolidine:

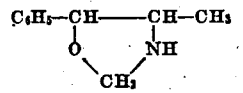

which may be obtained by the condensation of formaldehyde and 1-phenyl-1-hydroxy-2-propylamine.

It is not necessary to recover the condensation product of the initial reaction in the pure state, prior to subjecting this product to hydrogenation in the second stage of the reaction. It is only necessary to add a suitable catalyst to the reaction mixture obtained at the conclusion of the first reaction, and subject the mixture to the action of hydrogen, preferably under super-atmospheric pressure.

This second stage of our process is applicable to the reduction of any of the N-alkylidene-(arylhydroxyalkyl) amines, or any of the arylhydrooxazines or aryloxazolidines. However, we prefer to employ oxazolidines of the type:

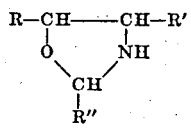

in which R represents an aryl group, R' may represent hydrogen or an alkyl group, and R"CHO represents an aldehyde component, and especially those in which R' and R" represent hydrogen or lower alkyl groups, R represents phenyl, or a substituted phenyl group having substituents which will not interfere, by preferential reduction or otherwise, with the hydrogenation of the oxazolidine ring to the simple amine structure.

The hydrogenation reaction is effected in the liquid phase, preferably employing sufficient solvent to prevent agglomeration of the catalyst, and to insure adequate mixture of the reactants and catalyst during hydrogenation. Any suitable solvent which is inert toward the catalyst and the components of the reaction mixture may be employed, as, for example, anhydrous or aqueous methyl or ethyl alcohol. As has previously been pointed out, the solvent utilized for the initial condensation reaction may be employed for the hydrogenation reaction, without the necessity for separating the condensation product.

The pressure and temperature relationships for the hydrogenation may be varied, depending upon the particular compound being hydrogenated, and the catalyst used in the process. Pressures from atmospheric to 2000 pounds per square inch are usually satisfactory, the higher pressures in general requiring less time for complete hydrogenation to occur. The reaction temperature should be maintained below 165° C., and desirably below 150° C. High temperatures in general favor more rapid hydrogenation, but at temperatures substantially above 165° C., there is a tendency for decomposition to occur with liberation of ammonia. We prefer to employ much lower temperatures, e. g., 15°–50° C.

Any hydrogenation catalyst which is active at the desired operating temperature may be employed in our process. A number of such hydrogenation catalysts are described in The Hydrogenation of Organic Substances, third edition, 1930, by Carleton Ellis. We prefer to use a finely-divided nickel catalyst prepared by dissolving aluminum from a nickel-aluminum alloy, by means of strong alkali solution. This catalyst is particularly advantageous since it is active at temperature as low as 25° C. Other catalysts, which are active at somewhat higher temperatures, may also be employed, and among these may be mentioned nickel precipitated from nickel carbonate and supported on infusorial earth (Covert, et al., Jour. Amer. Chem. Soc. 54, 1651 (1932)), nickel-silica gel catalysts (Holmes and Anderson, Ind. & Eng. Chem. 17, 280 (1925)), copper chromite (Adkins and Conner, Jour. Amer. Chem. Soc. 53, 1091 (1931)), copper silica gel (Holmes and Anderson, loc. cit.) and nickel formate (Ellis, loc. cit. page 145). These catalysts are active only at minimum temperatures ranging from about 80° C. to about 125° C., and hence are less desirable than the first-mentioned nickel catalyst. The amount of catalyst to be employed is not critical, since an excess has no deleterious effect, and the catalyst can usually be reused for subsequent hydrogenation. From 5% to 20%, based on the weight of the condensation product to be hydrogenated, will usually be satisfactory.

Our invention may be further illustrated by means of the following specific example:

Approximately 45 parts by weight of 1-phenyl-1-hydroxy-2-propylamine was dissolved in approximately 59 parts by weight of anhydrous ethyl alcohol and 30 parts by weight of 37% formalin solution was added. The temperature rose from 30° to 38° C. during the addition of the formaldehyde. After standing for one hour, the mixture was introduced into a hydrogenation bomb, together with approximately 7.5 parts by weight of a finely-divided nickel catalyst prepared by dissolving aluminum from an aluminum-nickel alloy by means of strong alkali solution. Hydrogen was introduced into the bomb to a pressure of approximately 1100 pounds per square inch, and the hydrogenation was allowed to proceed for one hour, at approximately 30° C. At the conclusion of this time, the pressure had dropped to approximately 900 pounds per square inch. The pressure was then released, and the catalyst was removed by filtration. Approximately 38 parts by weight of oxalic acid was added to the solution, which was then evaporated to a pasty consistency, dissolved in water, made alkaline with sodium hydroxide, and steam-distilled. Methyl (1-phenyl-2-propyl) amine was recovered as the oily layer of the steam distillate. This material was redistilled under reduced pressure, and was found to boil at 81.2° C. 15 mm.

It is to be understood, of course, that the above example is merely illustrative and does not limit the scope of our invention. Other reactants of the classes previously described may be substituted for the 1-phenyl-1-hydroxy-2-propylamine and the formaldehyde in the example, and the reaction conditions may be modified in numerous respects which will be apparent to those skilled in the art. In general it may be said that the use of any such modifications, and the use of any equivalents which would naturally occur to those skilled in the art, are included within the scope of our invention.

Our invention now having been described, what we claim is:

1. In a process for the production of N-substituted(arylalkyl) amines, the steps which comprise condensing an aldehyde with an (arylhydroxyalkyl) amine, and subjecting the resulting condensation product to liquid phase catalytic hydrogenation.

2. In a process for the production of alkyl-(arylalkyl) amines, the steps which comprise condensing an aliphatic aldehyde with an (arylhydroxyalkyl) amine, and subjecting the resulting condensation product to liquid phase hydrogenation at a temperature below 165° C., and in the presence of a nickel catalyst.

3. In a process for the production of methyl-(1-phenyl-2-propyl) amine, the steps which comprise condensing formaldehyde with 1-phenyl-1-hydroxy-2-propylamine, and subjecting the resulting condensation product to liquid phase hydrogenation at a temperature of 15°–50° C., and in the presence of a nickel catalyst.

4. In a process for the production of methyl-(1-phenyl-2-propyl) amine, the steps which comprise condensing formaldehyde with 1-phenyl-1- hydroxy-2-propylamine, and subjecting the resulting condensation product to liquid phase hydrogenation at a temperature of approximately 30° C., and in the presence of a finely-divided nickel catalyst prepared by dissolving aluminum from a nickel-aluminum alloy.

5. In a process for the production of alkyl-(arylalkyl)amines, the step which comprises subjecting a compound of the class consisting of N-alkylidene(arylhydroxyalkyl)amines, arylhydrooxazines, and aryloxazolidines to liquid phase catalytic hydrogenation.

6. In a process for the production of alkyl-(arylalkyl)amines, the step which comprises subjecting an N-alkylidene(arylhydroxyalkyl)amine to liquid phase catalytic hydrogenation at a temperature below 165° C., and in the presence of a nickel catalyst.

7. In a process for the production of alkyl-(arylalkyl)amines, the step which comprises subjecting a 4-alkyl-5-aryloxazolidine to liquid phase catalytic hydrogenation at a temperature below 165° C., and in the presence of a nickel catalyst.

8. In a process for the production of methyl-(1-phenyl-2-propyl)amine, the step which comprises subjecting 4-methyl-5-phenyloxazolidine to liquid phase hydrogenation, at a temperature of 15°–50° C., and in the presence of a nickel catalyst.

9. In a process for the production of methyl-(1-phenyl-2-propyl)amine, the step which comprises subjecting 4-methyl-5-phenyloxazolidine to liquid phase hydrogenation at approximately 30° C., and in the presence of a finely-divided nickel catalyst prepared by dissolving aluminum from an aluminum-nickel alloy.

ALFRED G. SUSIE.
HENRY B. HASS.